Feb. 8, 1949.  R. E. PAGE ET AL  2,461,438
RECORD CONTROLLED ACCOUNTING MACHINE
Filed March 15, 1944  7 Sheets-Sheet 1

INVENTORS
RALPH E. PAGE
HORACE S. BEATTIE
BY
ATTORNEY

Patented Feb. 8, 1949

2,461,438

UNITED STATES PATENT OFFICE 2,461,438

RECORD CONTROLLED ACCOUNTING MACHINE

Ralph E. Page, West Orange, and Horace S. Beattie, East Orange, N. J., assignors to International Business Machines Corporation, New York, N. Y., a corporation of New York Application March 15, 1944, Serial No. 526,632

6 Claims. (Cl. 235—61.6)

The present invention relates to devices for obtaining the algebraic summation of a plurality of amounts and more particularly to devices in which the summation is effected electrically.

The principal object of the invention is to provide an improved multidenominational relay totalizer in which an amount is entered digit by digit in descending order.

A further object resides in the provision of devices including a common adding network of relay contacts through which each digit entered is algebraically added to the digit standing in the related totalizer order, and including devices for clearing the order and entering therein the sum of the two digits.

A more specific object resides in the provision of devices for reading out an amount standing in the totalizer, digit by digit, adding another digit to the read out digit and entering the sum obtained, wherein the adding is effected by a device repeatedly effective for each digit read out.

A still further object resides in the provision of improved tens carry devices for a relay totalizer.

Another object resides in the provision of improved elusive one entry mechanism for an algebraic relay totalizer.

Another object resides in the provision of improved tens carry determining devices for a relay totalizer adding contact chain.

In carrying out the objects of the invention there is provided a relay totalizer having a plurality of denominational sections each including a set of entry and holding relays and a set of contacts upon which the digits are represented by combinational settings. Each set includes a tens carry relay and related contacts upon which a unit carried into the section is separately represented.

An amount is added into the totalizer by entering the amount digit by digit beginning with the highest denominational section. For each digit added, the digital value standing in the section is read out and set up in combinational form on contacts of an adding network and the section is cleared or zeroized. In accordance with the digit to be added a circuit path through the adding network is selected and through this path the relays of the section are energized according to the sum of the digit initially standing therein and the added digit if the sum is less than 10. Where such sum is 10 or more the relays of the section are energized according to the units digit of the sum and concurrently the tens carry relay of the next higher order is energized to increase the digital setting of such higher order by 1.

The adding network is common to all sections and each in turn sets up thereon its initial digit and the network in turn controls the successive sections with tens carries taken into account. Provision is made for handling negative amounts by causing the amount to be subtracted to enter additively as a 9's complement in which case there is a tens carry from the highest section whose entry into the lowest section is delayed to occur concurrently with the re-entry into such lowest section.

In the machine, the combinational system 0, 1, 2, 3, 4, 5 is employed rather than the decimal system to reduce the number of devices required and in such system the digits 0 to 5 are represented as 0, 1, 2, 3, 4, and 5 and the digits 6 to 9 are represented by the combination 1,5—2,5—3,5 and 4,5, respectively.

Other objects of the invention will be pointed out in the following description and claims and illustrated in the accompanying drawings, which disclose, by way of example, the principle of the invention and the best mode, which has been contemplated, of applying that principle.

Card handling mechanism

Figure 1:
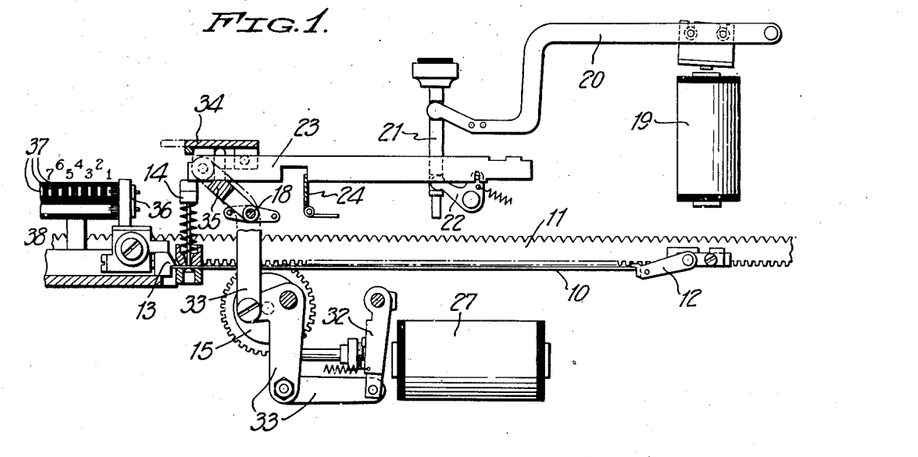
Fig. 1 is a view of the essential parts of a record card punching machine.
Figure 2:
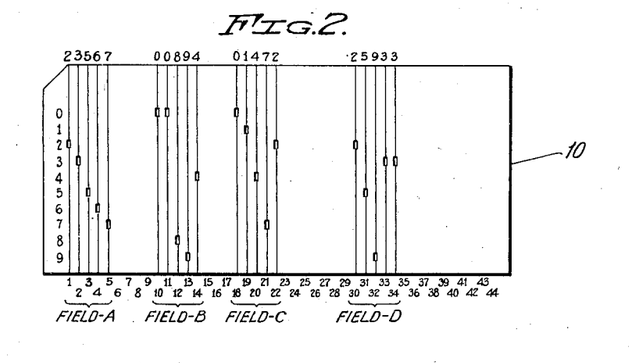
Fig. 2 is a record card.
Figure 4:
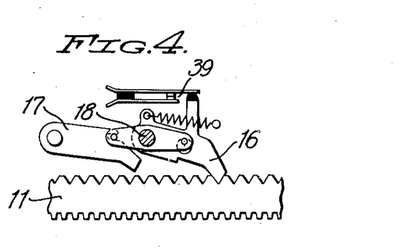
Fig. 4 is a detail of the escapement contacts and operating mechanism.

The record card 10 (Fig. 2) is provided with columns of index point positions designated 0 to 9 in which digits are recorded by perforations made in appropriate positions. These columns are grouped into fields such as fields A, B, C, and D and multidenominational amounts are recorded in such fields. In Fig. 2 the card is shown as having the amounts 23567, 00894 and 01472 punched in fields A, B, and C, respectively, and the total of these amounts, 25933, in field D. The blank card 10 is placed in the carriage of a well known type of punching machine which comprises a horizontally reciprocable rack 11 (Fig. 1) supporting a pusher 12 and a forward guide 13 between which the card 10 is held and moved step by step or column by column toward the left to bring each column in turn into line with a transverse row of punches 14. The rack 11 is geared to a spring drum 15 which normally urges the rack toward the left and an escapement device comprising stepping pawl 16 and holding pawl 17 control the rack's advance. When rod 18 (Fig. 4) is rocked counterclockwise, pawl 17 lowers into a rack tooth and pawl 16 is raised up and due to a loose fit on rod 18 the nose of pawl 16 moves slightly to the right under the influence of its spring so that when rod 18 is rocked back again pawl 17 is lifted up and pawl 16 engages the next rack tooth to space the rack one tooth or card column.

Figure 3:
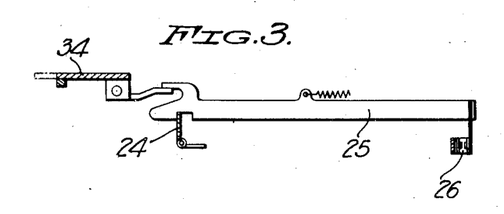
Fig. 3 is a detail of the interposer bail contacts and operating mechanism.

Magnet 19, of which there is one for each of the ten punching positions, will, when energized, rock lever 20, to depress key 21, which through bell crank 22 slides an interposer 23 to the left. Movement of interposer 23 will rock a plate 24 (Fig. 3) which through a hooked link 25 closes interposer contacts 26 to complete a circuit for punch magnet 27 (Fig. 1). This circuit is shown in Fig. 5f where closure of contacts 26 connects magnet 27 between main current supply lines 30 and 31.

When magnet 27 is energized it attracts its armature 32 (Fig. 1) and through linkage 33 rocks bail 34 to force the left end of the advanced interposer 23 down against the related punch 14 and at the same time, interposer 23 rocks bail 35 on rod 18 to engage pawl 17 in a rack tooth. Rocking of bail 34 (Fig. 3) disengages link 25 from plate 24 so that contacts 26 reopen, deenergizing magnet 27 and allowing the parts to return to their initial positions and causing the carriage to advance one step.

This briefly is the operation of the punching mechanism, and where columns are to be skipped, the well known space key (not shown) is actuated to step the carriage without punching. Attached to the carriage rack 11 is a brush 36 (Fig. 1) which traverses stationary, numbered segments 37 and electrically connects each in turn to a common conductor 38 as the correspondingly numbered card columns are in line with the row of punches 14. The usual escapement contacts 39 (Fig. 4) are also provided and these are diagrammatically represented as controlled by pawl 16 so that they open during the carriage escapement and reclose when the carriage has completed its step of advance.

Figure 5A:
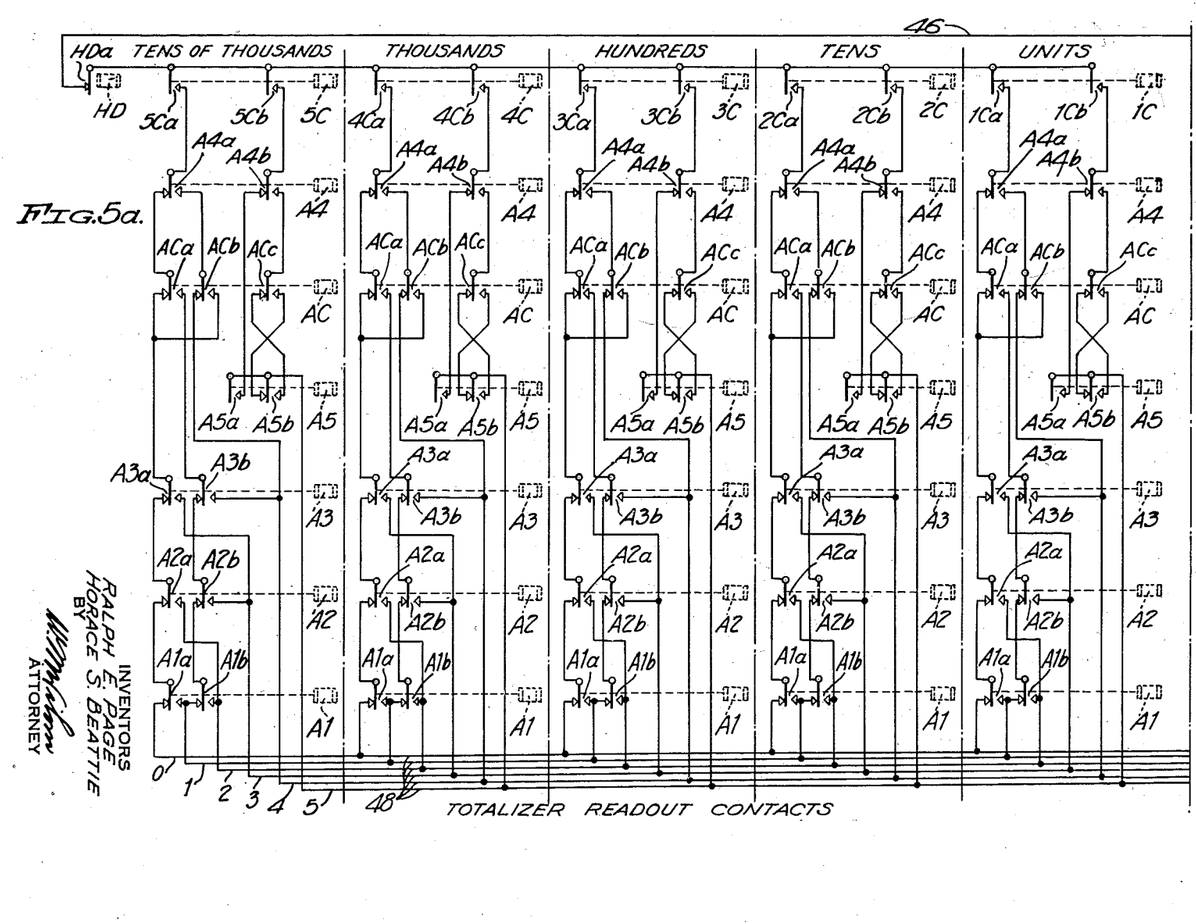
Figs. 5a, 5b, 5c, 5d, 5e, and 5f placed side by side in the order named constitute a wiring diagram of the electric circuits of the device.
Figure 5B:
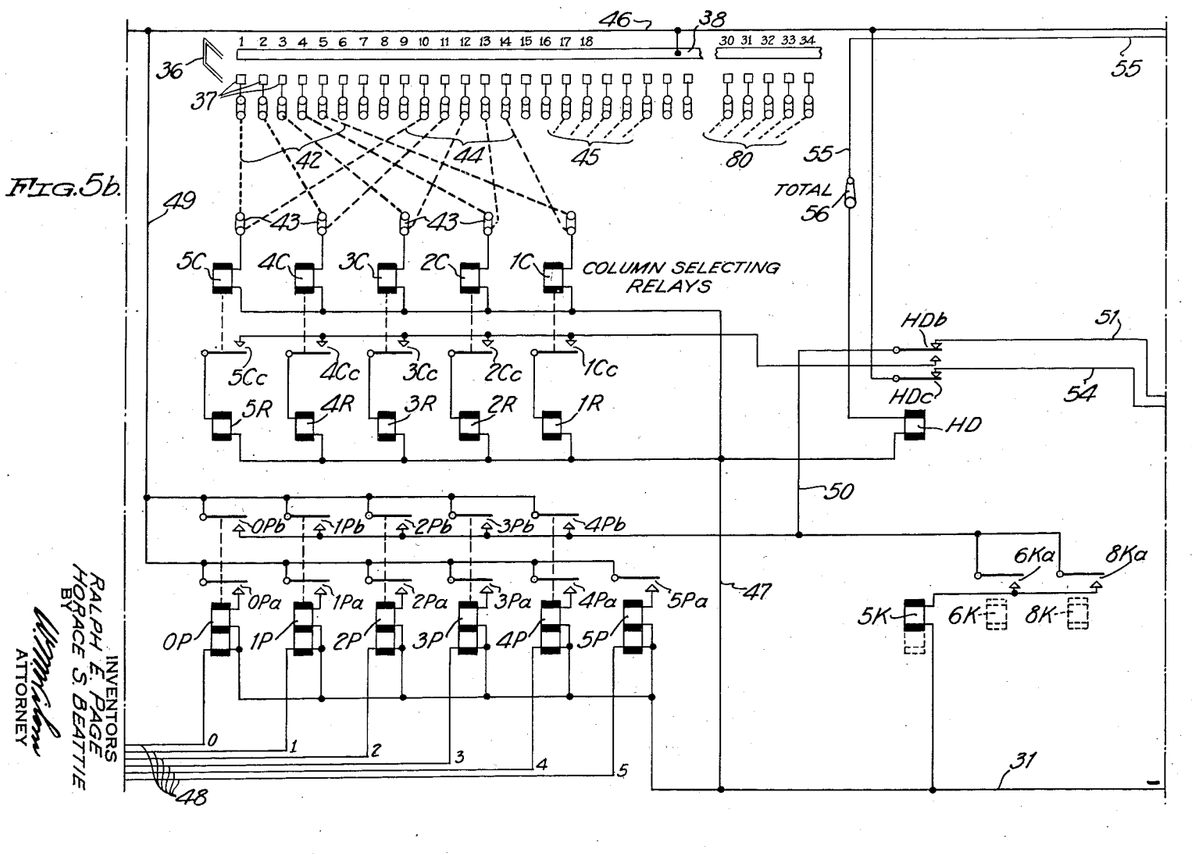
Figure 5C:
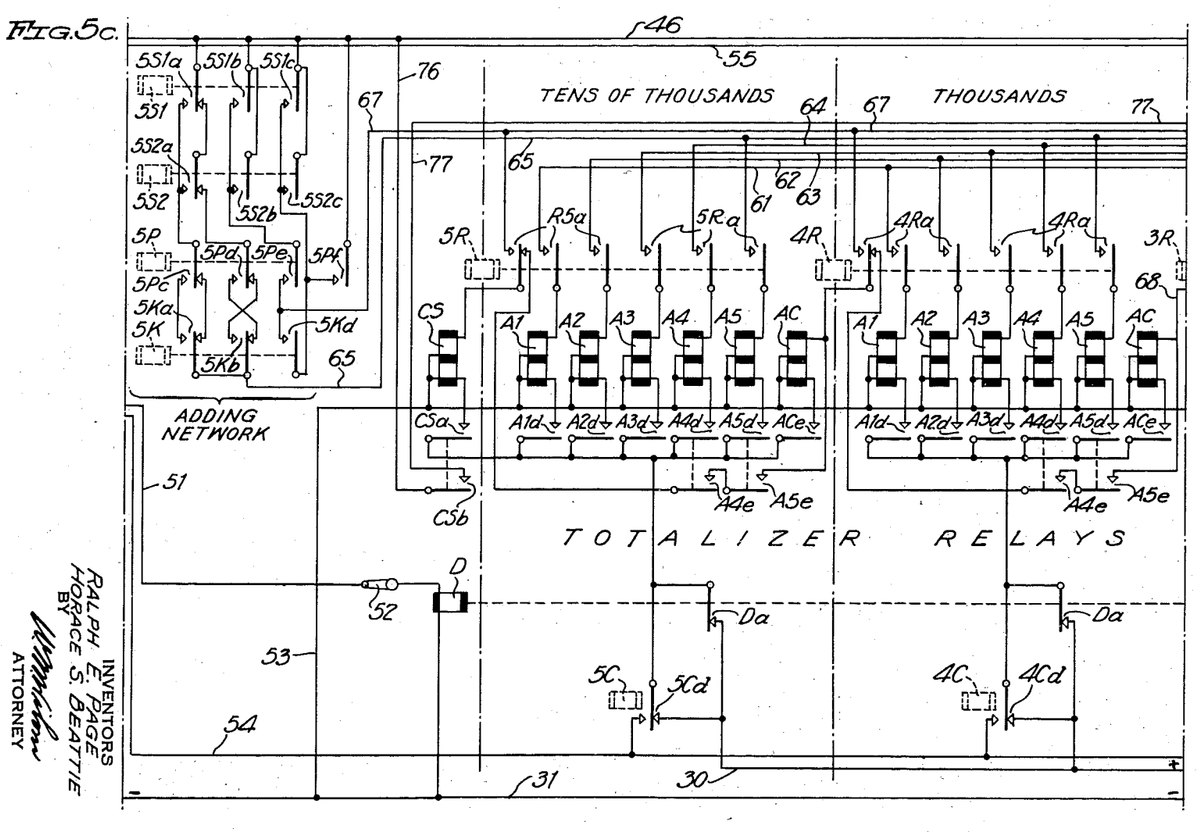
Figure 5D:
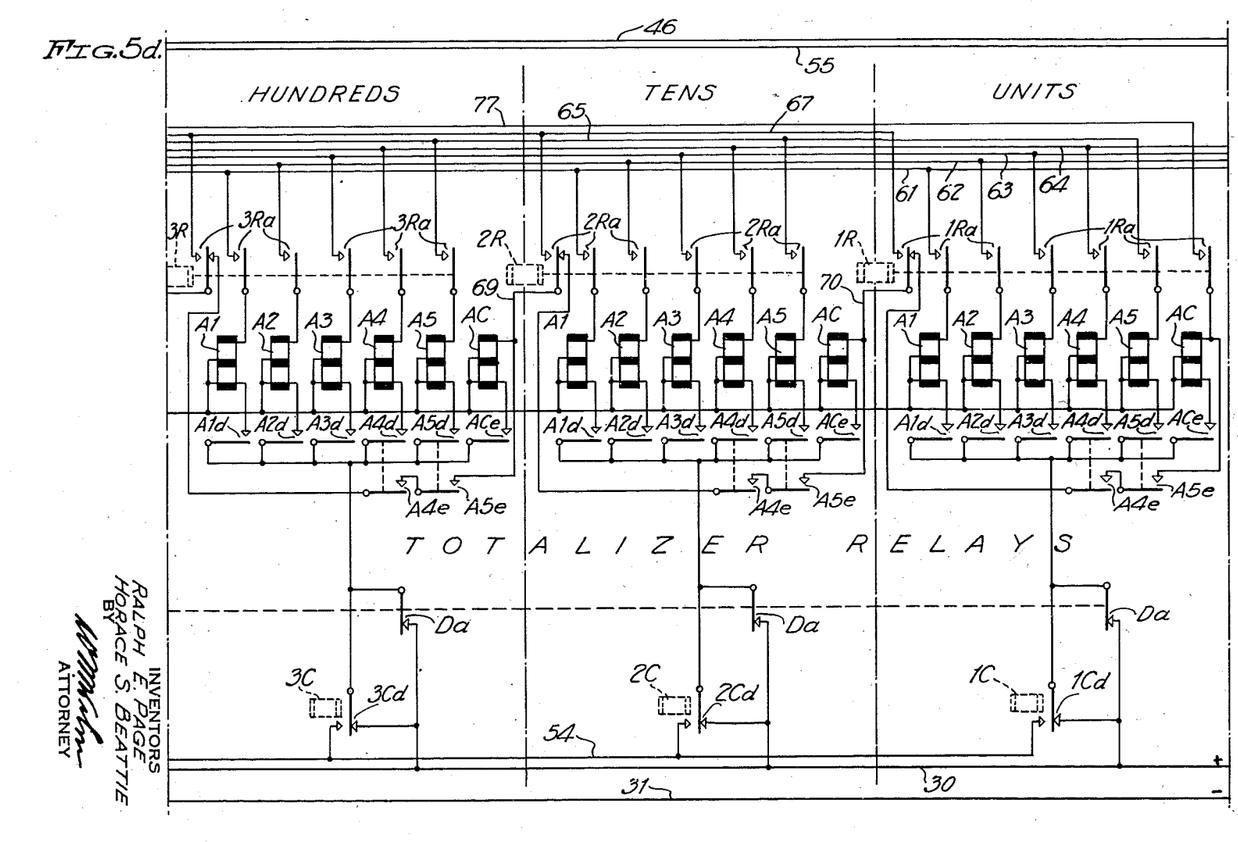
Figure 5E:
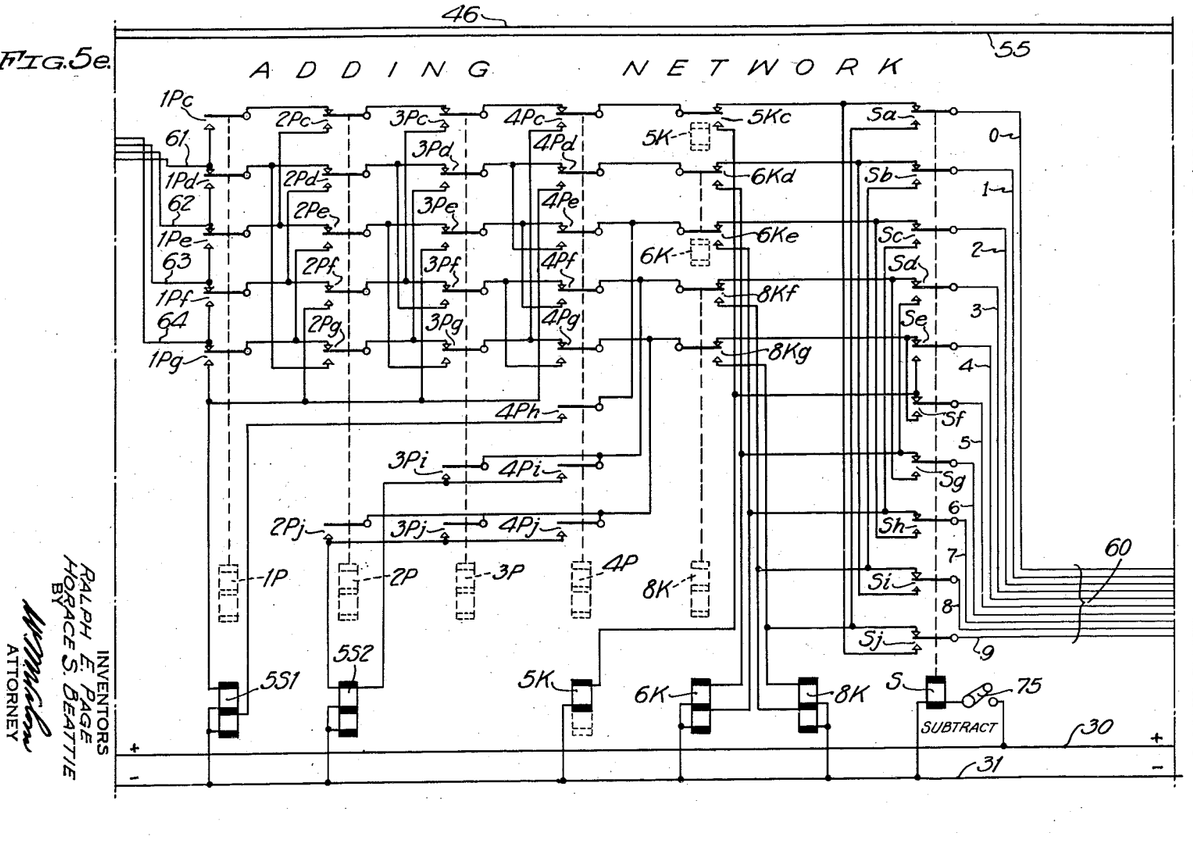
Figure 5F:
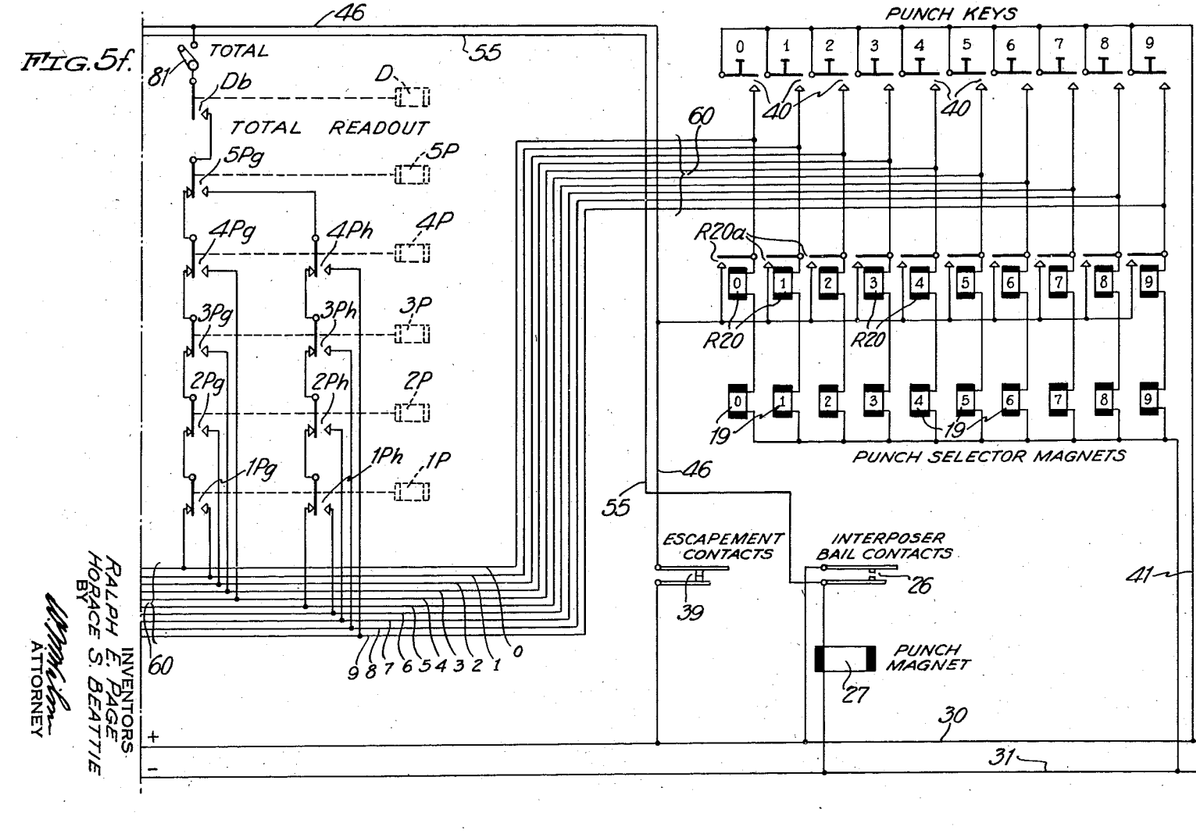

Referring now to Fig. 5f, there is provided, for the purposes of this invention, a set of digit representing, key actuated contacts designated 40. When any of these contacts is closed, it completes a circuit from line 30, wire 41, contacts 40, a relay R20, punch selector magnet 19 to line 31 to cause punching of the related digit in the card column at the punching station. The relay R20 closes its contacts to provide a momentary holding circuit through contacts 39.

Problem

The operation of the complete device may best be explained by tracing an actual problem through the successive steps of solution. Taking the problem of Fig. 2, the card is placed in position with its column 1 in line with the row of punches 14. Plug connections 42 (Fig. 5b) are made from the sockets wired to segments 37 related to field A to a group of sockets 43. Similar connections 44, 45, and 80 are also made to the sockets 43 from the segments 37 related to fields B, C, and D of the card.

Accordingly with column 1 of the card in position, brush 36 (Fig. 5b) is on the 1 segment 37 and a circuit is traceable from line 30 (Fig. 5f) contacts 39, wire 46 (Figs. 5e, 5d, 5c, 5b) conductor 38, brush 36, 1 segment 37, plug connection 42, left hand socket 43, relay 5C and wire 47 to line 31. When brush 36 is on the 2 segment 37, relay 4C is similarly energized and when the brush is on the 3, 4, and 5 segments, relays 3C, 2C, and 1C are likewise energized. Through plug connections 44 and 45 it is apparent also that relay 5C is energized when the brush is on the 10, 17 and 30 segments, relay 4C is energized when the brush is on the 11, 18 and 31 segments, relay 3C is energized when the brush is on the 12, 19 and 32 segments, relay 2C is energized when the brush is on the 13, 20 and 33 segments, relay 1C is energized when the brush is on the 14, 21 and 34 segments. Thus there is an invariable energization of a selected one of the relays 5C to 1C in accordance with the card column that is in punching position.

In Fig. 5a, these relays, when energized, close contacts identified by the same reference character as the relay, suffixed by letters a and b. Thus relay 5C closes contacts 5Ca and 5Cb in what may be called a relay storage chain. There are five such chains provided and identified by denominational designations and each includes contacts controlled by relays A1, A2, A3, A4, A5 and AC as well as one of the relays 5C to 1C. In any denominational section a digit is represented and stored by energization of one or a combination of A relays with the digits 1 to 5 represented by energization of relays A1 to A5 respectively and the digits 6 to 9 represented by energization of relay A5 together with A1 to A4. The relay AC adjusts the connections to add a tens carry as will be explained.

For the present problem it is assumed that the storage chain is clear, that is, no significant digit is represented and all the A relays are deenergized. Thus, when contacts 5Ca close upon arrival of the first card column in punching position, there is a circuit connection from wire 46 (connected to line 30 through contacts 39, Fig. 5f, as explained), contacts HDa, contacts 5Ca, left hand contacts A4a, left hand contacts ACa, left hand contacts A3a, left hand contacts A2a, left hand contacts A1a to wire designated 0 of a group 48, a relay 0P (Fig. 5b) to line 31.

It may be well at this point to specifically trace the circuit paths for each of the other digits to show that relays 0P to 5P are energized in accordance with the digital value in the denominational chain. Thus, the circuits are traceable:

For digit 1, from 5Ca, left hand contacts A4a, left hand contacts ACa, left hand contacts A3a, left hand contacts A2a, right hand contacts A1a to the 1 wire 48 and relay 1P.

For digit 2, from 5Ca, left hand contacts A4a, left hand contacts ACa, left hand contacts A3a, right hand contacts A2a to the 2 wire 48 and relay 2P.

For digit 3, from 5Ca, left hand contacts A4a, left hand contacts ACa, right hand contacts A3a to the 3 wire 48 and relay 3P.

For digit 4, from 5Ca, right hand contacts A4a, left hand contacts ACb to the 4 wire 48 and relay 4P.

For the digit 5, from 5Cb, left hand contacts A4b, contacts A5a to the 5 wire 48 and relay 5P.

For the digits 6 there are parallel circuits as traced for digits 1 and 5 to energize relays 1P and 5P.

For the digit 7 there are parallel circuits as traced for the digits 2 and 5 to energize relays 2P and 5P.

For the digit 8 there are parallel circuits as traced for the digits 3 and 5 to energize relays 3P and 5P.

For the digit 9 there are parallel circuits, one of which is as traced for the digit 4 and the other is traceable from 5Ca, right hand contacts A4b, left hand contacts ACc, right hand contacts A5b, to the 5 wire 48 to energize relays 4P and 5P.

Relays 0P to 5P (Fig. 5b) close their a contacts, as 0Pa for the present problem, to provide a holding circuit from wire 46, wire 49, contacts 0Pa, relay 0P to line 31. A pair of contacts 0Pb, also close to complete a circuit from wire 46, wire 49, contacts 0Pb, wire 50, upper contacts HDb, wire 51 (Fig. 5c), switch 52, relay D to line 31. Relay D opens several contacts Da in the holding circuits of relays A1 to A5 and AC. For the tens of thousands group of A relays, however, relay 5C is energized prior to relay D so that the holding circuit is maintained when contacts Da open, from line 31 (Fig. 5c), wire 53, the A relay or relays, contacts A1d (for example), left hand contacts 5Cd, wire 54 (Fig. 5b), contacts HDc to wire 46 and line 30 through escapement contacts 39. Since it is assumed that no A relays are energized, opening of contacts Da and shifting of contacts 5Cd is ineffectual at this time.

The operator now depresses a key (Fig. 5f) to close the 2 contacts 40 and the effect of this is to energize the 2 punch selecting magnet 19 and the 2 relay R20. As a result the 2 interposer is advanced to close contacts 26 and energize punch magnet 27 to punch a 2 hole in column 1 of the card. Contacts 26 complete a further circuit from line 30 (Fig. 5f), contacts 26, wire 55 (Figs. 5e, 5d, 5c and 5b), switch 56, relay HD and wire 47 to line 31. Relay HD opens its contacts HDc to break the holding circuit through wire 54 and contacts 5Cd. It also shifts its contacts HDb to break the circuit through wire 51 and relay D (Fig. 5c). The holding circuit for the A relays (Fig. 5c) is broken before contacts Da reclose so that the A relays related to the tens of thousands order are now all deenergized and in readiness to receive a setting.

Relay HD also opens its contacts HDa (Fig. 5a) to open the circuit through the storage chains. The relay 0P, however (Fig. 5b) is still energized as is also the relay 5C so that a circuit is now traceable from line 31, wire 47, relay 5R, contacts 5Cc, lower contacts HDb, wire 50, contacts 0Pb, wire 49, 46 (Fig. 5f), contacts 39 to line 30. Relay 5R shifts a set of contacts designated 5Ra (Fig. 5c) and through one of these contacts a circuit will now be completed to enter the digit 2 on the A relays. This circuit is traceable from line 30 (Fig. 5f), contacts 39, the 2 contacts R20a, the 2 wire of a group designated 60 (Fig. 5e), contacts Sc, 6Ke, 4Pe, 3Pe, 2Pe and 1Pe, wire 62 (Figs. 5d and 5c), contacts 5Ra, relay A2, wire 53 to line 31. Relay A2 closes its contacts A2d to set up a holding circuit from line 31, wire 53, relay A2, contacts A2d, contacts Da to line 30. This circuit is completed concurrently with the energization of the punch selector magnet 19. As the selected punch enters the card, interposer bail contacts 26 reopen to break the circuit through relay HD (Fig. 5b), escapement contacts 39 open to break the circuit through column selecting brush 36 so that relay 5C is deenergized, and the 0P and 5R relays also become currentless. Contacts 5Cd of relay 5C (Fig. 5c) now return to normal and provide a supplemental holding circuit for the A relays in the tens of thousands order which is maintained until relay 5C is energized again.

The card now escapes to present its column 2 to the row of punches and brush 36 is on the 2 segment 37. Through circuits similar to those traced for the first column, relay 4C (Fig. 5b) is first energized and closes its contacts 4Ca and 4Cb (Fig. 5a) to connect the thousands order storage chain and since no significant entry is contained therein a circuit is completed to the 0 wire 49 to energize relay 0P as before. The operator now depresses the 3 key to close the 3 contacts 40 and energize the 3 magnet 19 to punch a 3 in column 2 of the card.

The energization of relay 0P closes a holding circuit through its contacts 0Pa and its contacts 0Pb energize relay D (Fig. 5c) to open contacts Da. When the interposer bail contacts 26 (Fig. 5f) close, relay HD is energized, resulting in the breaking of the holding circuit of the A relays in the thousands order and the energization of relay 4R (Fig. 5b) through contacts 4Cc and 0Pb. The entry circuit is then traceable from line 30 (Fig. 5f), contacts 39, contacts R20a of the 3 relay R2o, the 3 wire 60 (Fig. 5e), contacts Sd, 8Kf, 4Pf, 3Pf, 2Pf, 1Pf, wire 63 (Figs. 5d, 5c), contacts 4Ra, relay A3 and wire 53 to line 31.

Following escapement of the card, relay 3C becomes energized and the operator closes the 5 key contacts 40, and in this case the entry circuit is traceable from line 30 (Fig. 5f), contacts 39, the 5 contacts R20a, the 5 wire 60 (Fig. 5e) contacts Sf (upper), and relay 5K to line 31. This relay shifts its contacts 5Ka, 5Kb and 5Kd (Fig. 5c) and a further circuit is thereupon completed, from wire 46 (connected to line 30 through contacts 39), contacts 5S1a, 5S2a, 5Pd, 5Kb (left), wire 65 (Fig. 5d), contacts 2Ra to the A5 relay in the hundreds order.

With the card in column 4 position the 6 is entered through the following circuit: from line 30 (Fig. 5f), contacts 39, the 6 contacts R20a, the 6 wire 60 (Fig. 5e), contacts Sg (upper), relay 6K to line 31. Relay 6K shifts its contacts 6Kd so that the circuit branches at contacts Sg to contacts 6Kd (lower), contacts 4Pd, 3Pd, 2Pd, and 1Pd to wire 61 (Fig. 5d) and thence to the A1 relay in the tens order. Relay 6K also closes a pair of contacts 6Ka (Fig. 5b) which results in energization of a second winding of relay 5K through a circuit from line 31, relay 5K, contacts 6Ka, contacts 0Pb to wire 46 and line 30. Relay 5K as already explained completes a circuit to wire 65 (Figs. 5c and 5d) to energize the A5 relay in the tens order, so that there is a 6 now entered and manifested by energization of the A1 and A5 relays.

Finally, with the card in the column 5 position a 7 is entered in the units order through the following circuit: from line 30 (Fig. 5f), contacts 39, the 7 contacts R20a, the 7 wire 60, contacts Sh (upper), relay 6K to line 31. Relay 6K shifts its contacts 6Ke so that the circuit branches at contacts Sh to contacts 6Ke (lower), 4Pe, 3Pe, 2Pe, 1Pe to wire 62 (Fig. 5d) and the A2 relay in the units order. Relay 6K also closes its contacts 6Ka (Fig. 5b) to energize relay 5K as before to in turn energize the A5 relay in the units order.

The foregoing has explained the entry of the several digits 2, 3, 5, 6 and 7. The entering circuits for the other digits will now be traced. For digit 1 the circuit is from line 30, contacts 39, the 1 contacts R20a, the 1 wire 60, contacts Sb, 6Kd, 4Pd, 3Pd, 2Pd, 1Pd to the wire 61 and thence to the A1 relay in a selected order.

For the digit 4 the circuit is from line 30, contacts 39, the 4 contacts R20a, the 4 wire 60, contacts Se, 8Kg, 4Pg, 3Pg, 2Pg, 1Pg to the wire 64 and thence to the A4 relay in a selected order.

For the digit 8, the circuit runs from the 8 wire 60, through contacts Si to relay 8K which shifts its contacts 8Kf (Fig. 5e), so that the circuit branches at contacts Si through contacts 8Kf (lower), 4Pf, 3Pf, 2Pf and 1Pf to wire 63, and thence to the A3 relay in a selected order. Relay 8K closes contacts 8Ka (Fig. 5b) to energize relay 5K which, as explained, causes the A5 relay in the selected order to become energized.

For the digit 9, the circuit runs from the 9 wire 60, through contacts Sj to the relay 8K which shifts its contacts 8Kg (Fig. 5e), so that the circuit branches at contacts Sj, through contacts 8Kg (lower), 4Pg, 3Pg, 2Pg and 1Pg to wire 64 and thence to the A4 relay in a selected order. Relay 8K causes energization of relay 5K as for the 8 digit, so that the A5 relay is also energized in the selected order. For the digit 0, no circuit is established and the selected order remains cleared.

At this point in the operation, the amount 23567 has been punched in field A of the card (Fig. 2) and stored on the contacts of Fig. 5a and the relays of Figs. 5c and 5d. The card carriage is now advanced by any suitable well known means, such as a skip bar, to present column 10 to the punches, in which the digit 0 is to be punched. Brush 36 connects the segment 37 of column 10 to wire 46 (Fig. 5b) and a circuit is completed through plug connections 44 to relay 5C which thereupon closes its contacts 5Ca and 5Cb in Fig. 5a. This highest order contains a setting of 2 represented by a shifted condition of contacts A2a and A2b. The circuit is completed from wire 46, contacts 5Ca, A4a (left), ACa, A3a, A2a (right), to the 2 wire 48 (Fig. 5b) and the relay 2P. The setting in this order is thus transferred to the set of P relays and the A relays of the related order are then cleared as before.

Relay 2P shifts its contacts in Fig. 5e so that the A relay now to be energized will represent the sum of the initial digit and the digit being punched, in this case 2+0. The reentering circuit is traceable from line 30 (Fig. 5f), contacts 39, contacts R20a of the 0 relay R20, 0 wire 60 (Fig. 5e), contacts Sa, 5Kc, 4Pc, 3Pc, 2Pc (lower), 1Pe, wire 62 (Figs. 5d and 5c), contacts 5Ra, relay A2 and wire 53 to line 31.

The card escapes to column 11 where relay 3P becomes energized in the now familiar manner and, when the 0 key is operated, the reentering circuit is traceable from the 0 wire 60 through contacts Sa, 5Kc, 4Pc, 3Pc (lower), 2Pf, 1Pf to wire 63 and the A3 relay of the thousands order.

The card escapes to column 12 where relay 5P becomes energized and, when the 8 key is operated, circuits will be completed to enter the sum of 5 and 8 by setting the hundreds order at 3 and energizing the carry relay AC in the thousands order. This is effected as follows: Relay 8K (Fig. 5e) is energized through a circuit from the 8 wire 60, contacts Si and relay 8K. This circuit branches at contacts Si to contacts 8Kf (lower), 4Pf, 3Pf, 2Pf and 1Pf to wire 63 and the A3 relay in the hundreds order, thereby entering a 3 therein. Relay 8K closes its contacts 8Ka (Fig. 5b) to energize relay 5K so that there is also a circuit traceable in Fig. 5c from wire 46, contacts 5Pf (closed), 5Kd (closed), wire 67 (Fig. 5d), left hand contacts 3Ra (shifted), wire 68 (Fig. 5c), relay AC of the thousands order, wire 53 to line 31. Thus in the thousands order relays A3 and AC are now set.

The card now steps to column 13 in which relay 2C becomes energized and, since there is a 6 entered in the corresponding order, relays 1P and 5P are energized. When the operator closes the 9 contacts 40, the sum of 6 and 9, namely, 15, will be entered with the 5 going into the tens order of the A relays and the 1 being entered in the AC relay of the hundreds order. For entering the 5 in the tens order, the circuit from the 9 wire 60 energizes relay 8K through contacts Sj, and when contacts 8Kg close, the circuit branches from contacts Sj, through contacts 8Kg (lower), 4Pg, 3Pg, 2Pg, 1Pg (lower) to a relay 5S1 and line 31. Relay 8K also causes energization of relay 5K (Fig. 5b) as before, so that in Fig. 5c relays 5S1, 5P and 5K are all energized and two circuit paths are traceable. One is from wire 46, contacts 5S1a (left), 5Pc (left), 5Ka (left) and wire 65 (Fig. 5d), contacts 2Ra to the A5 relay in the tens order. The other is from wire 46 (Fig. 5c), contacts 5Pf and 5Kd (both closed) to wire 67 (Fig. 5d), left hand contacts 2Ra (shifted), wire 69 to relay AC in the hundreds order, so that the hundreds order now has relay A3 and AC energized.

The card then steps to column 14 in which a 4 is to be punched. Relay 1C becomes energized, and relays 2P and 5P. A circuit is then completed in Fig. 5e from the 4 wire 60, contact Se, 8Kg, 4Pg, 3Pg, 2Pg (lower), 1Pd, wire 61 (Fig. 5d), contact 1Ra, to the A1 relay in the units order. This circuit branches at contact 8Kg, to contacts 2Pj and relay 5S2 to line 31. Relay 5S2 in turn shifts its contacts in Fig. 5c so that, since relay 5P is also energized, there is a circuit traceable from wire 46, contacts 5S2b, 5Pe to wire 67 (Fig. 5d), left hand contacts 1Ra (shifted), wire 70 to the AC relay in the tens order.

Thus, after the amounts in fields A and B have been punched, the sum of these two amounts is manifested on the A relays as 24461 with the particular relays energized being A2 for the tens of thousands order
A3, AC for the thousands order
A3, AC for the hundreds order
A5, AC for the tens order
A1 for the units order The contacts in Fig. 5e (with the exception of the contacts of relay S) and the contacts in the upper left hand corner of Fig. 5c constitute an adding network on which two digits are set and their sum determined. The contacts in Fig. 5e select the 1, 2, 3 or 4 digit components while the contacts in Fig. 5c select the 5 digit component and the tens carry component where the sum is greater than 9. It is to be noted that the same network serves for all the pairs of digits for all denominational orders, that is, it adds the two tens of thousands digits, then the two thousands digits, etc., in descending order and, when any sum involves a carry, a 1 is entered in the higher order.

The card carriage is now advanced to the first column of field C in which 01472 is to be punched. With column 13 in position, relay 5C is energized and causes energization of relay 2P. Thereafter, as for column 10, punching of a 0 will reenter a 2 in the tens of thousands order and the card steps to column 19, where relay 4C is energized and with relays A3, AC set, relay 4P becomes energized through a circuit in Fig. 5a traceable from wire 46, contacts HDa, contacts 4Ca, A4a, ACa (right), A3b (right), 4 wire 48 (Fig. 5b) to the relay 4P. Punching of a 1 in this column causes completion of the reentering circuit traceable in Fig. 5e from the 1 wire 60, contacts Sb, 6Kd, 4Pd (lower) to relay 5S1 and line 31. Relay 5S1 shifts its contacts in Fig. 5c to complete a circuit from wire 46, contacts 5S1a (left), 5Pc, 5Ka, wire 65, contacts 4Ra, relay A5, wire 53 to line 31 to enter a 5 in this order.

Upon stepping to column 20, relay 3C is energized and with relays A3 and AC set in this order, relay 4P is again energized so that upon punching of a 4 the reentering circuit is traceable from the 4 wire 60 (Fig. 5e), contacts Se, 8Kg, 4Pg (lower), 3Pf, 2Pf, 1Pf, wire 63 to the A3 relay in the hundreds order. A parallel branch extends from contacts 8Kg to contacts 4Pj and relay 5S2 which shifts its contacts in Fig. 5c to complete the circuit for entering the 5 component. This is traceable from wire 46, contacts 5S1a, 5S2a (left), 5Pc, 5Ka, wire 65, contacts 3Ra to the A5 relay. This leaves an 8 in the hundreds order.

When the card steps to column 21, relay 2C is energized and with relays A5 and AC set, relays 5P and 1P become energized through parallel circuits, one of which is traceable in Fig. 5a from contacts 2Cb, A4b, A5a (shifted) to the 5 wire 48 and relay 5P. The other is traceable from contacts 2Ca, A4a, ACa (right), A3b, A2b, A1b to the 1 wire 48 and relay 1P. Upon punching a 7 hole, the reentering circuits are traceable from the 7 wire 60 (Fig. 5e), contacts Sh and relay 6K to line 31. As a result, relay 5K is also energized (Fig. 5b) through contacts 6Ka. The reentering circuit branches at contacts Sh, through contacts 6Ke (lower), 4Pe, 3Pe, 2Pe, 1Pe (lower) to wire 63 and the A3 relay in the tens order. For the AC relay the circuit is traceable in Fig. 5c from wire 46, contacts 5Pf, 5Kd, wire 67, contacts 2Ra (left) and the AC relay of the hundreds order to carry a 1 therein.

Finally, when the card steps to column 22, relay 1C is energized and with relay A1 set in this column, relay 1P is energized, so that upon punching a 2 hole, the reentering circuit is traceable in Fig. 5e from the 2 wire 60, contacts Sc, 6Ke, 4Pe, 3Pe, 2Pe, 1Pe (lower), wire 63 to the relay A3 in the units order.

The storage relays thus are set as follows after all three amounts have been entered:

A2 for the tens of thousands order
A5 for the thousands order
A3, A5, AC, for the hundreds order
A3 for the tens order
A3 for the units order Where a so-called carry-on-carry is involved in a summation, the AC relays in higher orders are energized as may be best explained by assuming a specific example. Assume the amount 996 set on the three lowest orders and the value 5 is entered in the units order. Then, when the 5 is punched, the entering circuit is traceable from the 5 wire 60 (Fig. 5e), contacts Sf, relay 5K to line 31. This circuit branches through contacts 5Kc (lower), 4Pc, 3Pc, 2Pc, 1Pc to wire 61 and the A1 relay of the units order. In Fig. 5c the carry circuit is traceable from wire 46, contacts 5Pf, 5Kd, wire 67 (Fig. 5d), contacts 1Ra (left) and relay AC in the tens order. This circuit branches through contacts A5e, A4e of the tens order, left hand contacts 2Ra (right) to the AC relay in the hundreds order and in turn branches through contact A5e and A4e of the hundreds order, left hand contacts 3Ra (right) to the AC relay (Fig. 5e) in the thousands order. As a result, the relays are now set as follows:

AC for the thousands order
A4, A5, AC for the hundreds order
A4, A5, AC for the tens order
A1 for the units order The foregoing explains how three amounts are additively entered into the storage relays which in effect constitute a totalizer in which the sum of the entered amounts is manifested in combinational form and carries are separately manifested but automatically merged into the total when the amount is read out of the totalizer. Obviously, more or fewer amounts may be added together in the manner explained by providing further plug connections between segments 37 and the sockets 43 (Fig. 5b).

Provision is made for effecting subtraction of any of the amounts and in such case a switch 75 (Fig. 5e) is closed prior to punching the amount to energize relay S, which will shift its related contacts in series with wires 60 so that the 9's complement of the amount will be added. Thus, for example, if the amount standing in the A relays is 24461 and the amount 01472 is to be subtracted, the energization of relay S will cause the 9's complement 98527 to be entered just as though this latter amount were additively punched and the resulting sum 22988 will be manifested in the familiar manner as the punch keys are actuated. This amount requires correction by adding the elusive 1 in the units order and this is brought about as follows:

When the 0 contacts 40 (Fig. 5f) are closed to effect punching of the first digit of the amount to be subtracted, the entering circuit is traceable in Fig. 5e from the 0 wire 60, contacts Sa (lower), relay 8K to line 31. The parallel circuit extends through contacts 8Kg (lower), 4Pg, 3Pg, 2Pg (lower), since there is a 2 in this order, 1Pd, wire 61 to relay A1 in the tens of thousands order. A further parallel circuit extends through contacts 8Kg (lower), 2Pj and relay 5S2 to line 31, since there is a 2 standing in the highest order at this time and relay 5S2 accordingly shifts its contacts in the upper left corner of Fig. 5c. Relay 8K has closed its contacts 8Ka (Fig. 5b) so that relay 5K is energized and in Fig. 5c there is now a circuit traceable from wire 46, contacts 5S2c, contacts 5Kd, wire 67, left hand contacts 5Ra (left), relay CS, wire 53 to line 31. This relay is then held energized through its contacts CSa, and will cause a 1 to be entered into the units order later when the units order is in entry receiving condition. At such later time, when relay 1R is energized there is a circuit traceable from wire 46 (Fig. 5c), wire 76, contacts CSb, wire 77 (Fig. 5d), right hand contacts 1Ra to the AC relay in the units order to thus add a unit therein.

Inspection of the connections will show that, if the highest order contained a 0, relay CS would be energized during the entry into some lower order through the carry-on-carry connections. In constructing the machine it was assumed that the total would always be a positive value so that no provision is made for negative balances, that is, the amount substracted would always be less than the amount standing in the totalizer.

For recording the total back on the record card plug connections 80 (Fig. 5b) are made from the segments 37 of the card columns in which the total is to be punched to sockets 43 and, after the several amounts have been entered as explained, the card is advanced to present column 30 (Fig. 2) to the row of punches. Brush 36 will thereupon cause energization of relay 5C through a connection 80 and with contacts 5Ca and 5Cb (Fig. 5a) closed, circuits will be completed to energize the P relays (Fig. 5b) in accordance with the digital value standing in the tens of thousands order. For the example chosen, this value is a 2 so that relay 2P is energized.

The operator closes total switch 81 (Fig. 5f) and opens total switch 56 (Fig. 5b). Energization of relay 2P closes its contacts 2Pb (Fig. 5b) so that relay D becomes energized (Fig. 5c) as before and opens its contacts Da. This relay also closes contacts Db (Fig. 5f) and with contacts 2Pg and 2Ph shifted as a result of the energization of relay 2P a circuit is traceable from line 30, contacts 39, wire 46, switch 81, contacts Db, 5Pg, 4Pg, 3Pg, 2Pg (right), 2 wire 60, 2 relay R20, 2 selector magnet 19 to line 31. Magnet 19 shifts its punch interposer, closing contacts 26 to energize the punch magnet 27, punch a 2 in column 30 and escape to column 31.

The circuit to the 2 wire 60 also extends to the left through the adding network as for an adding operation but such circuit cannot be completed because the R relays are not energized during this total taking operation since relay HD through whose contacts HDb (lower) the R relays are energized, is not picked up as switch 56 is now open.

It will be recalled that when adding relay D (Fig. 5c) became energized through the b contacts of the P relays (Fig. 5b), contacts Da opened to break a branch of the A relay holding circuits, but that contacts 5Cd (for example) nevertheless held the circuits through contacts HDc and these opened when relay HD became energized upon closure of the interposer bail contacts 26 to break the holding circuit and deenergize the A relays of an order. In the present operation, however, since relay HD does not become energized, contacts 5Cd (left) maintain the holding circuit until the escapement contacts 39 open and at such time the C and P relays became deenergized so that the b contacts of the P relays open and deenergize relay D. Referring to Fig. 5c, the contacts 5Cd (left) break before the right hand contacts make and such break occurs before contacts Da reclose. There is thus a break in the A relay holding circuit resulting in clearing of the order in which total punching has just occurred.

The A relays remain clear as the card steps to the next column where relay 4C is picked up and the next total digit 5 is punched and so on through the remaining orders.

In the circuit diagram the total switches 56 and 81 are shown diagrammatically as hand switches, but it will be apparent that they may be arranged in well known manner as contacts automatically closed by the card carriage when the carriage is in the first total punching column in which case the manual intervention is obviated.

While there have been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In an apparatus of the class described, a set of relay magnets energized to represent a digital entry therein, contacts controlled by said magnets, an adding network arranged in accordance with the table of addition, means controlled by said contacts for adjusting said network in accordance with the digital value entered in said set of relay magnets, means settable to represent a digit to be added to said first digital value, means controlled thereby for clearing said set of relay magnets, further separate means concurrently controlled thereby and including said adjusted network for selectively energizing the magnets of said set of relay magnets in accordance with the units digit of the sum of the two digits, and means for retaining said selected magnets energized.

2. In an apparatus of the class described, a series of denominationally ordered sets of relay magnets, each set energizable to represent a digit of a multidenominational number, a set of contacts for each set of magnets, an adding network arranged in accordance with the table of addition of any two digits, means for causing each set of contacts in succession to adjust said network in accordance with the digital value in the related set of magnets, means operable for each successive adjustment of said network for completing circuit connections to the magnets of each set to enter therein the units digit of the sum of the digit initially therein and any other digit and for completing a circuit connection to the magnets of the next higher ordered set to enter a 1 therein when said sum is greater than 9.

3. In an apparatus of the class described, a series of denominationally ordered sets of relay magnets, each set energizable to represent a digit of a multidenominational number, a set of contacts for each set of magnets, an adding network arranged in accordance with the table of addition of any two digits, means for causing each set of contacts in succession and beginning with the highest order set to adjust said network in accordance with the digital value in the related set of magnets, means operable for each successive adjustment of said network for completing circuit connections to the magnets of each set to enter therein the units digit of the sum of the digit initially therein and the 9's complement of any other digit, means for entering a fugitive 1 in the lowest ordered set when said set in turn adjusts the network, and means operable for rendering said fugitive entry means effective only when the sum obtained for the highest set exceeds 9.

4. In an apparatus of the class described, denominationally ordered sections each comprising a set of relay magnets, a set of readout contacts for each set of magnets controlled thereby to represent the digit standing in the related section, a set of adding magnets, means for causing the readout contacts of each section to in turn control said set of adding magnets, adding contacts controlled by said adding magnets, a single set of digit representing contacts selectively operable for each operation of the adding magnets, means controlled by said digit representing contacts which operated in correspondence with the setting of the adding contacts for causing clearing of the section whose contacts operated the adding magnets, and further means jointly controlled by said digit representing contacts and said adding contacts for operating the magnets of the cleared section in accordance with the units digit of the sum of the digit set on the adding contacts and the digit represented by the selectively operated contact.

5. In an apparatus of the class described, multidenominational sections, a readout device for each section, an adding device controllable by the readout device of each section to receive the digit standing in the related section, said adding device being normally controlled by the readout device of a preselected section, a single set of keys, one for each of the digits and operable in selective succession to represent the successive digits of an amount to be entered into said sections, means controlled by any key upon operation thereof for causing zeroizing of the said preselected section, further means controlled thereby for causing the adding device to enter into said zeroized section the units digit of the sum of the initial digit and the digit represented by the operated key, and still further means controlled thereby for causing the next successive section to control the adding device in accordance with the digital setting of said next section.

6. In a machine of the class described, a set of input circuit connections, a set of output circuit connections, each set of connections being energizable to represent the digits, a set of contacts settable to represent any digit and interconnecting said input and output sets of connections, so that current transmitted to the input set representative of a digit will be transmitted through said contacts to the output set to represent thereon the units digit of the sum of the digit represented on the input set and the digit set on the contacts, a plurality of sets of entry receiving magnets, each settable to represent a digit, means for connecting each set of magnets in turn to said set of output connections, means controlled by each set of magnets when it is connected to the output connections for causing setting of the said set of contacts in accordance with the digit set in the set of magnets, transmission of current to said input lines at such time causing operation of the set of magnets in accordance with the units digit of the sum of the digit initially therein and the digit represented by the input connections through which current is transmitted.

RALPH E. PAGE.
HORACE S. BEATTIE.

REFERENCES CITED

The following references are of record in the file of this patent:

UNITED STATES PATENTS

| Number | Name | Date |
|---|---|---|
| 1,813,830 | Weiner | July 7, 1931 |
| 1,866,995 | Bryce | July 12, 1932 |
| 2,061,745 | Wadel | Nov. 24, 1936 |
| 2,170,453 | Bryce | Aug. 22, 1939 |
| 2,350,499 | Dickinson | June 6, 1944 |
| 2,386,763 | Williams | Oct. 16, 1945 |

FOREIGN PATENTS

| Number | Country | Date |
|---|---|---|
| 412,747 | Great Britain | July 5, 1934 |